(12) United States Patent
Ono et al.

(10) Patent No.: US 8,941,254 B2
(45) Date of Patent: Jan. 27, 2015

(54) EXHAUST GAS TURBOCHARGER (75) Inventors: Yoshihisa Ono, Tokyo (JP); Keiichi Shiraishi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 37 days.

(21) Appl. No.: 13/818,535

(22) PCT Filed: Oct. 27, 2010

(86) PCT No.: PCT/JP2010/069056
§ 371 (c)(1),
(2), (4) Date: Feb. 22, 2013

(87) PCT Pub. No.: WO2012/056525
PCT Pub. Date: May 3, 2012

(65) Prior Publication Data
US 2013/0154266 A1    Jun. 20, 2013

(51) Int. Cl.
*F01D 15/10* (2006.01)
*F02C 6/00* (2006.01)
(Continued)

(52) U.S. Cl.
CPC ............. *H02K 7/1823* (2013.01); *H02K 1/185* (2013.01); *H02K 5/04* (2013.01); *H02K 5/20* (2013.01);
(Continued)

(58) Field of Classification Search
CPC ....... H02K 7/1823; H02K 1/185; H02K 5/20; H02K 15/0006; H02K 5/04; H02K 9/19; H02K 7/18; H02K 5/00; F02B 39/10; F02B 37/10; F02B 39/00; F02B 37/00; Y02T 10/144

USPC .......................................................... 290/52
See application file for complete search history.

(56) References Cited

U.S. PATENT DOCUMENTS 7,219,643 B2 *   5/2007   Hoi et al. ................ 123/196 AB
8,627,662 B2 *   1/2014   Freund et al. ................. 60/606
(Continued)

FOREIGN PATENT DOCUMENTS

CN        1719028 A      1/2006
CN      200953499 Y      9/2007
(Continued)

OTHER PUBLICATIONS

Decision of Patent Grant dated Jun. 18, 2013, issued in Japanese Patent Application No. 2009-165787, with English translation (6 pages).
(Continued)

*Primary Examiner* — Javaid Nasri
(74) *Attorney, Agent, or Firm* — Westerman, Hattori, Daniels & Adrian, LLP (57) ABSTRACT

A generator housing that accommodates, in the interior thereof, a hollow-cylindrical liner and a stator that is disposed on a radially inner side of the liner has a split-in-two structure that can be divided into two parts at a plane including the rotation axis of the rotation shaft; and individual joints formed inside the generator housing between a pathway and a hole for supplying a cooling medium to the pathway, which is formed inside the liner, and also a hole for exhausting the cooling medium from the pathway are provided with ring-like members that are provided with front surfaces that face the liner and back surfaces that face the generator housing and that have a through-hole that communicates between the hole and the pathway or a through-hole that communicates between the hole and the pathway center portions thereof.

5 Claims, 7 Drawing Sheets (51) Int. Cl.
*H02K 7/18* (2006.01)
*H02P 9/04* (2006.01)
*H02K 1/18* (2006.01)
*H02K 5/04* (2006.01)
*H02K 5/20* (2006.01)
*H02K 15/00* (2006.01)
*F02B 37/10* (2006.01)
*F02B 39/10* (2006.01)
*H02K 9/19* (2006.01)

(52) U.S. Cl.
CPC ............ *H02K 15/0006* (2013.01); *F02B 37/10* (2013.01); *F02B 39/10* (2013.01); *H02K 9/19* (2013.01); *Y02T 10/144* (2013.01)
USPC .......................................................... 290/52

(56) References Cited

U.S. PATENT DOCUMENTS

2004/0245872 A1 12/2004 Eppler et al.
2010/0001597 A1 1/2010 Noll

FOREIGN PATENT DOCUMENTS

| CN | 101573516 | A | 11/2009 |
| JP | 52-134604 | A | 10/1977 |
| JP | 8-336261 | A | 12/1996 |
| JP | 2001-25211 | A | 1/2001 |
| JP | 2003-0199291 | A | 7/2003 |
| JP | 2004-364494 | A | 12/2004 |
| JP | 2006-296005 | A | 10/2006 |
| JP | 2007-056790 | A | 3/2007 |
| JP | 2008-527955 | A | 7/2008 |

OTHER PUBLICATIONS

International Search Report for PCT/JP2010/069056, mailing date of Dec. 7, 2010.
Chinese Office Action dated Jul. 31, 2014, issued in corresponding CN application No. 201080068734.3 with Englisah translation (18 pages).

* cited by examiner

EXHAUST GAS TURBOCHARGER

TECHNICAL FIELD

The present invention relates to an exhaust gas turbocharger, particularly to an exhaust gas turbocharger that is mounted on a ship internal combustion engine, an internal combustion engine for a land-based-generator, or the like.

BACKGROUND ART

One such exhaust gas turbocharger is equipped with a generator whose rotation shaft is linked to rotation shafts of a turbine and a compressor of a turbocharger (for example, see Patent Literature 1).

CITATION LIST

Patent Literature

{PTL 1} Japanese Unexamined Patent Application, Publication No. 2007-056790

SUMMARY OF INVENTION

Technical Problem

With the exhaust gas turbocharger disclosed in Patent Literature 1 described above, a generator is cooled by a cooling medium (for example, water), and a liner in which a pathway (water jacket) for allowing the cooling medium to flow is formed in the interior thereof and a stator positioned on a radially inner side of the liner are secured to the inner circumferential surface of a generator housing by means of shrink fitting. Because of this, there is a problem in that it is not possible to replace only the liner and the stator by removing the liner and the stator from the generator housing during a maintenance inspection, thus increasing the maintenance inspection costs.

The present invention has been conceived in light of the above-described circumstances, and an object thereof is to provide an exhaust gas turbocharger with which it is possible to replace only a liner and a stator by easily removing the liner and the stator from a generator housing during a maintenance inspection, making it possible to reduce the maintenance inspection costs.

Solution to Problem

In order to solve the problems described above, the present invention employs the following solutions.

An exhaust gas turbocharger according to the present invention is an exhaust gas turbocharger including a turbine unit that is driven by exhaust gas guided thereto from an internal combustion engine; a compressor unit that is driven by the turbine unit to feed fresh air to the internal combustion engine; and a generator having a rotation shaft that is linked to rotation shafts of the turbine unit and the compressor unit, wherein a generator housing that accommodates, in the interior thereof, a hollow-cylindrical liner that forms the generator, in which a pathway for allowing a cooling medium that cools the generator to flow is formed in the interior thereof, and a stator that forms the generator, which is disposed on a radially inner side of the liner, has a split-in-two structure that can be divided into two parts at a plane including the rotation axis of the rotation shaft; and individual joints formed inside the generator housing between the pathway and a first hole for supplying the cooling medium to the pathway and also a second hole for exhausting the cooling medium from the pathway are provided with ring-like members that are provided with front surfaces that face the liner and back surfaces that face the generator housing and that have a through-hole that communicates between the first hole and the pathway or a through-hole that communicates between the second hole and the pathway at center portions thereof.

In a generator according to the present invention, a generator housing that accommodates, in the interior thereof, a hollow-cylindrical liner, in which a pathway for allowing a cooling medium to flow is formed in the interior thereof and a stator, which is disposed on a radially inner side of the liner, has a split-in-two structure that can be divided into two parts at a plane including the rotation axis of a rotation shaft; and individual joints formed inside the generator housing between the pathway and a first hole for supplying the cooling medium to the pathway and also a second hole for exhausting the cooling medium from the pathway are provided with ring-like members that are provided with front surfaces that face the liner and back surfaces that face the generator housing and that have a through-hole that communicates between the first hole and the pathway or a through-hole that communicates between the second hole and the pathway at center portions thereof.

In the exhaust gas turbocharger or the generator according to the present invention, the generator housing that accommodates the liner and the stator has the split-in-two structure that can be divided into two parts at the plane including the rotation axis of the rotation shaft, and, during a maintenance inspection, merely by removing one part of the generator housing from the other part thereof, it is possible to expose the liner and the stator that are accommodated in the interior thereof.

The liner and the generator housing are connected (linked) solely by the ring-like members that are disposed in the individual joints between the pathway and the first hole for supplying the cooling medium to the pathway and also the second hole for exhausting the cooling medium from the pathway.

By doing so, it is possible to replace only the liner and the stator by easily removing the liner and the stator from the generator housing during a maintenance inspection, making it possible to reduce the maintenance inspection costs.

It is easy to remove the liner and the stator from the generator housing and to attach the liner and the stator to the generator housing, and thus, the amount of time required for disassembly and assembly can be reduced, making it possible to enhance the ease of maintenance.

In the exhaust gas turbocharger described above or the generator described above, it is more preferable that at least one circumferential groove be formed along a circumferential direction in each of the front surfaces and the back surface, and O-rings be disposed in the individual circumferential grooves.

With such an exhaust gas turbocharger or a generator, in a state in which the ring-like members are disposed in the individual joints between the first hole and the pathway, as well as in the individual joints between the second hole and the pathway, the O-rings accommodated in the circumferential grooves are placed in a pressed state (deformed state) by means of the outer circumferential surface of the liner and the front surfaces of the ring-like members or by means of the inner circumferential surface of the generator housing and the back surfaces of the ring-like members.

By doing so, it is possible to reliably prevent leakage (outflow) of the cooling medium from between the joining surfaces between the generator housing and the liner, that is, between the inner circumferential surface of the generator housing and the outer circumferential surface of the liner.

An internal combustion engine according to the present invention is equipped with an exhaust gas turbocharger having excellent ease of maintenance, making it possible to reduce the maintenance inspection costs.

With the internal combustion engine according to the present invention, running costs can be reduced and stoppage time required for a maintenance inspection can be reduced.

Advantageous Effects of Invention

An exhaust gas turbocharger according to the present invention affords an advantage in that it is possible to replace only a liner and a stator by easily removing the liner and the stator from a generator housing during a maintenance inspection, making it possible to reduce the maintenance inspection costs.

DESCRIPTION OF EMBODIMENT

An embodiment of an exhaust gas turbocharger according to the present invention will be described below with reference to FIGS. 1 to 7.

Figure 1:
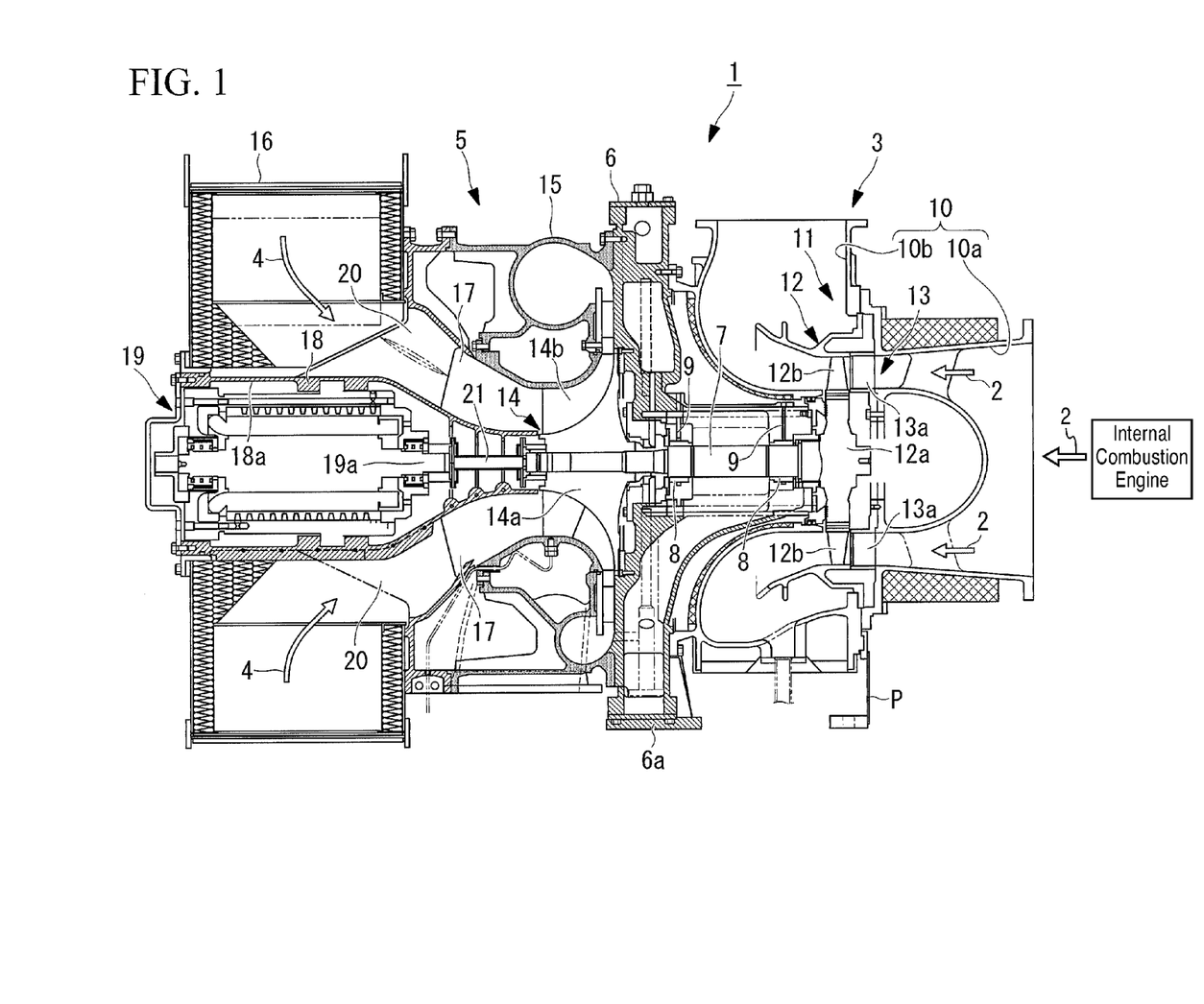
FIG. 1 is a longitudinal sectional view of an exhaust gas turbocharger according to an embodiment of the present invention.
Figure 2:
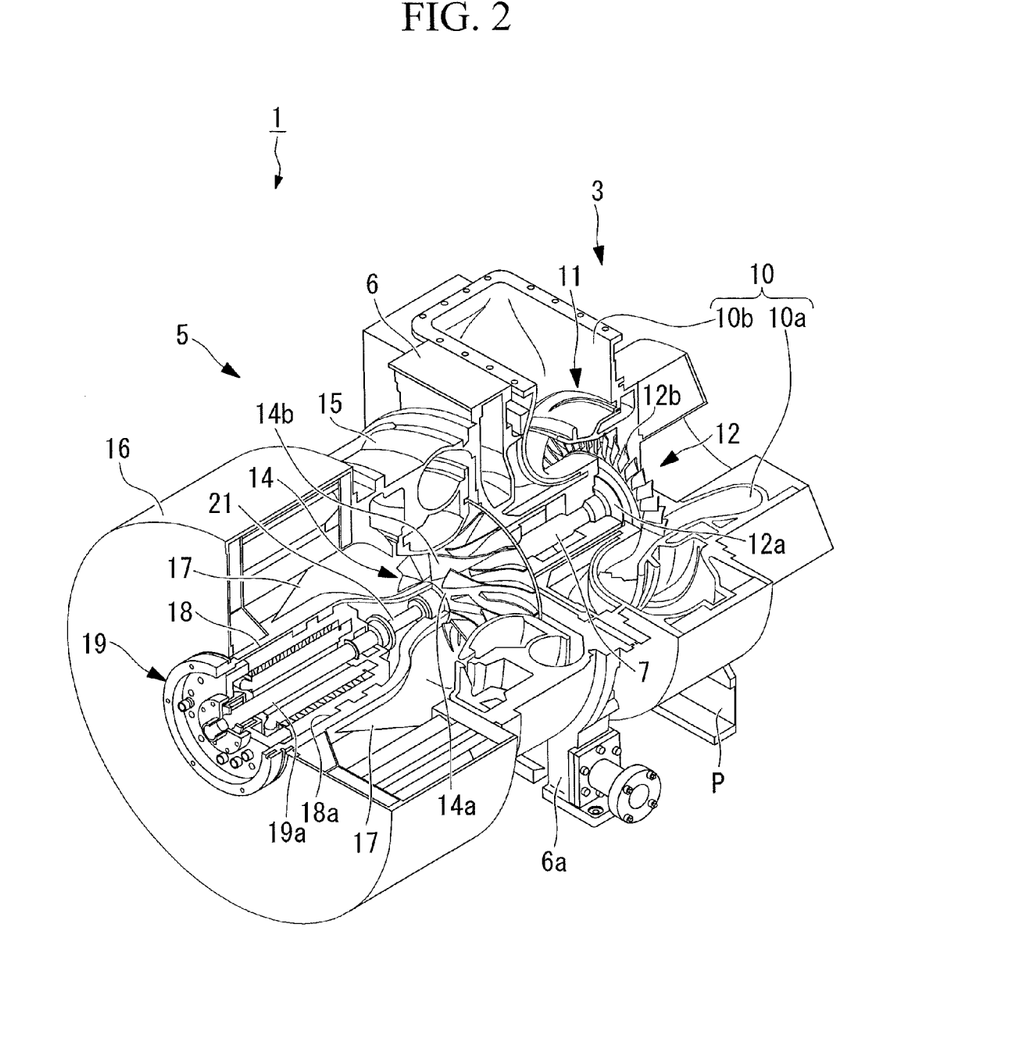
FIG. 2 is a partially cutaway perspective view of the exhaust gas turbocharger shown in FIG. 1 viewed from a muffler side.
Figure 3:
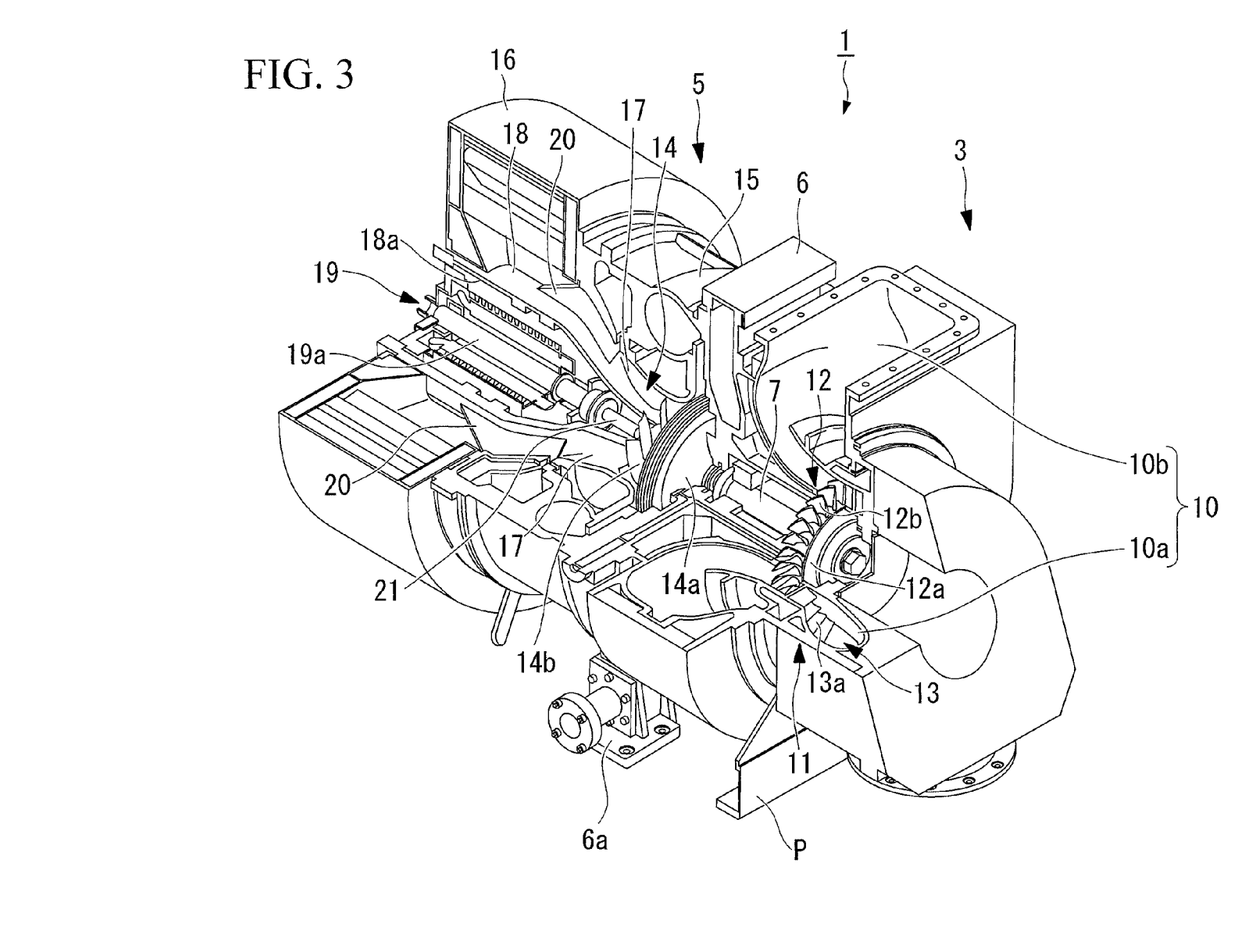
FIG. 3 is a partially cutaway perspective view of the exhaust gas turbocharger shown in FIG. 1 viewed from a turbine side.
Figure 4:
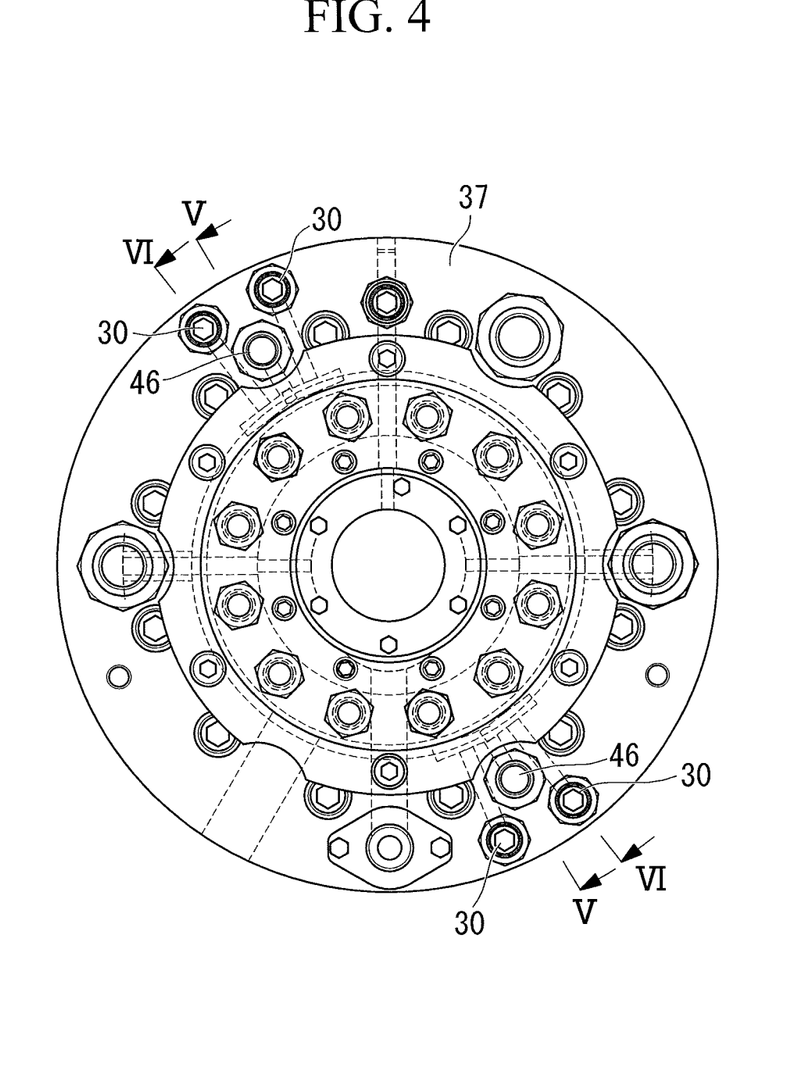
FIG. 4 is a diagram of a generator shown in FIG. 1 viewed from the muffler side and is a front view of a cover member that forms the generator.
Figure 5:
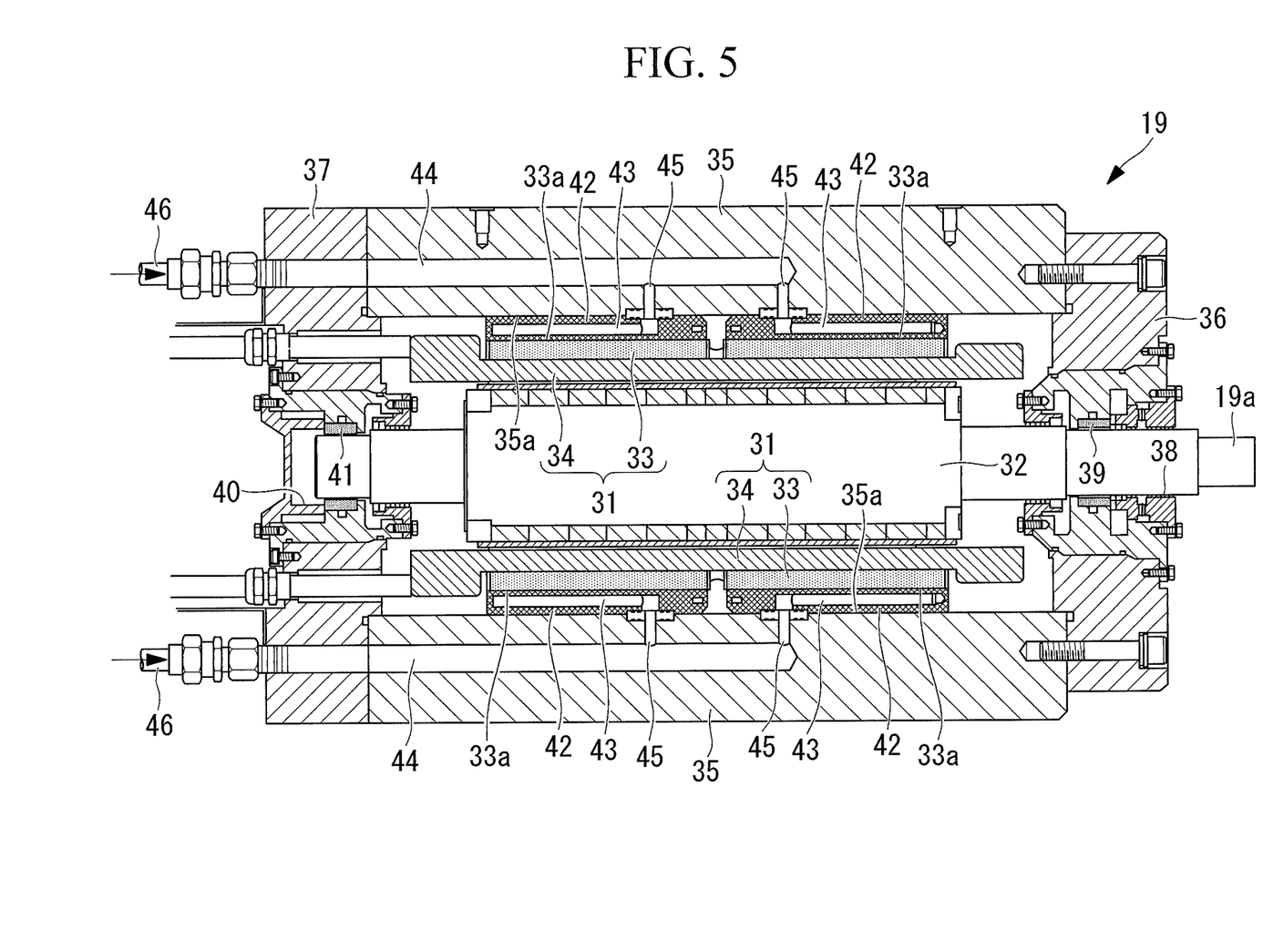
FIG. 5 is a sectional view taken along arrows V-V in FIG. 4.
Figure 6:
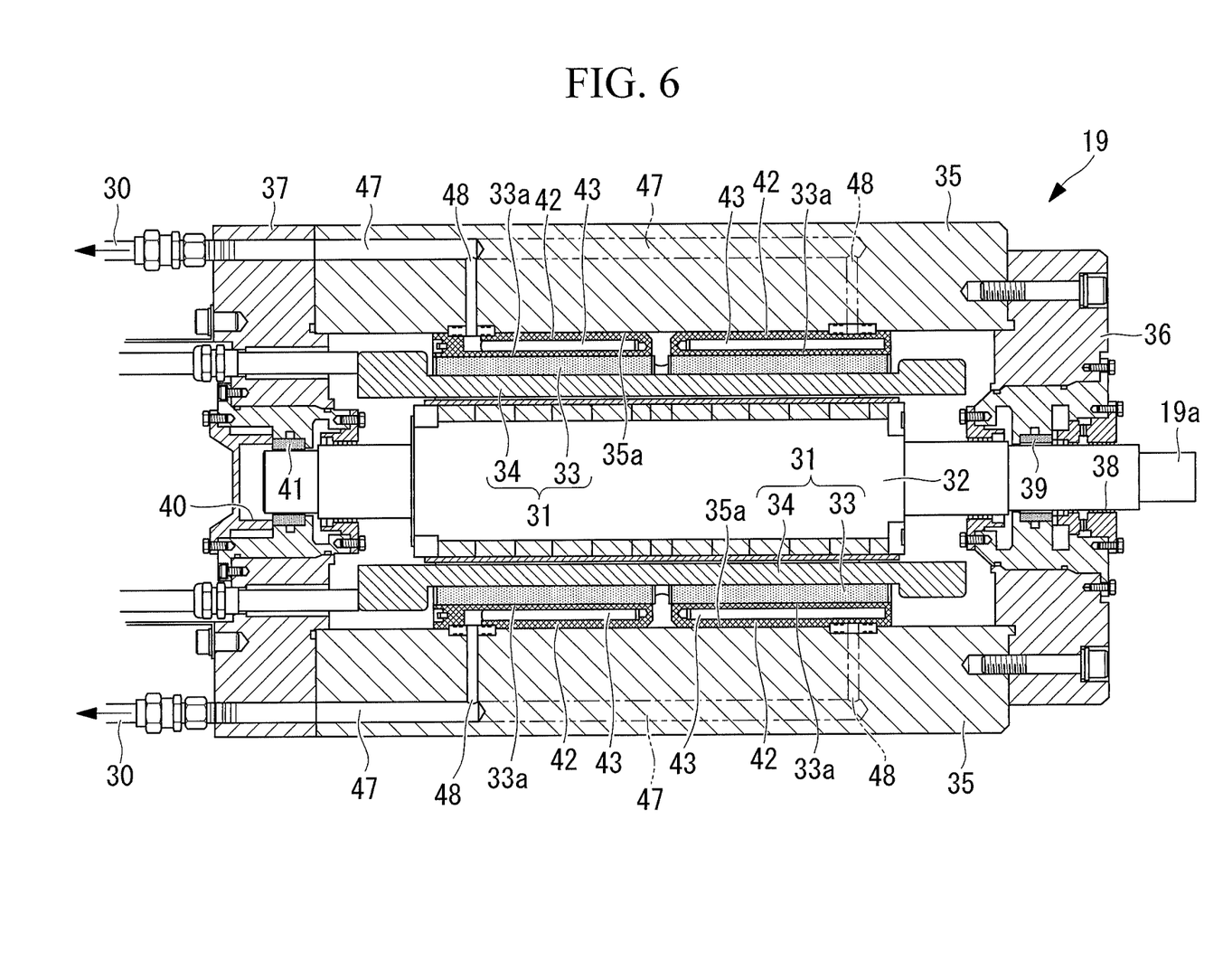
FIG. 6 is a sectional view taken along arrows VI-VI in FIG. 4.
Figure 7A:
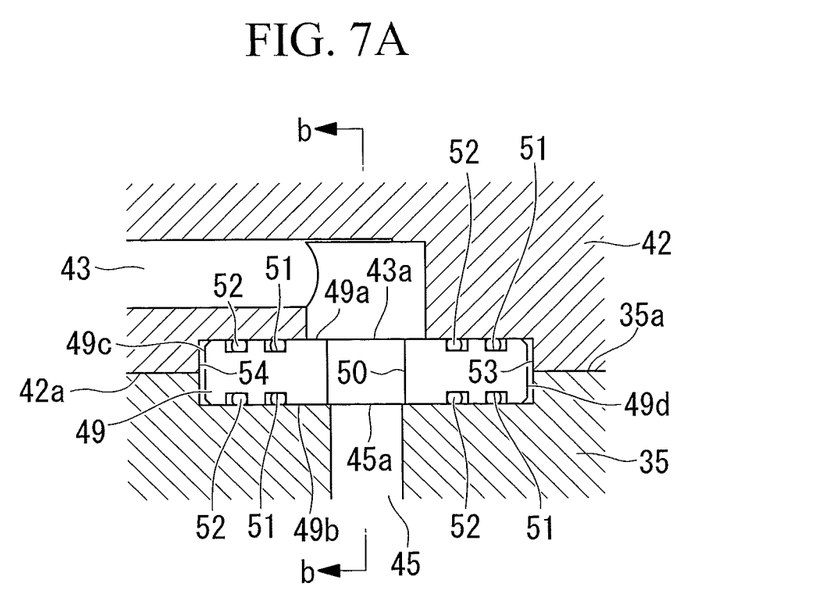
FIG. 7A is a diagram in which a relevant portion in FIG. 5 is shown in enlargement.
Figure 7B:
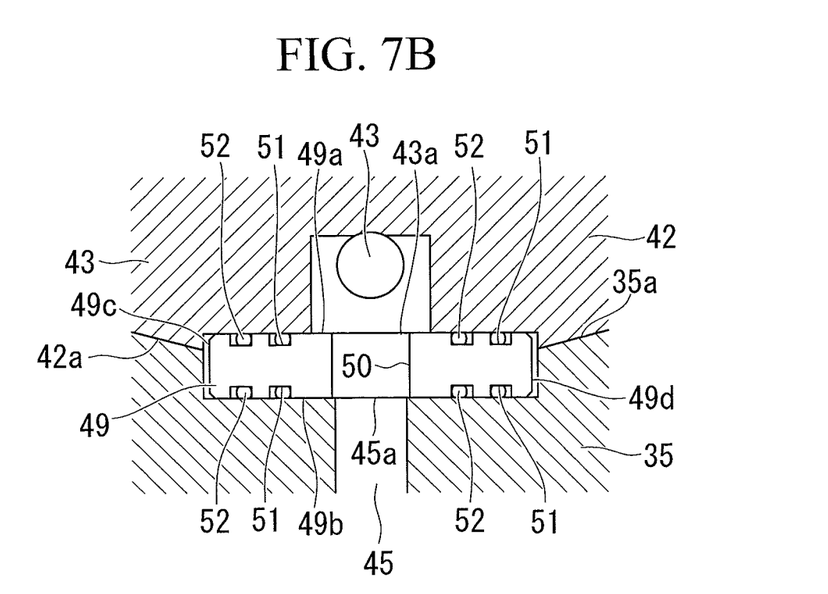
FIG. 7B is a sectional view taken along arrows b-b in FIG. 7A.

FIG. 1 is a longitudinal sectional view of an exhaust gas turbocharger according to this embodiment, FIG. 2 is a partially cutaway perspective view of the exhaust gas turbocharger shown in FIG. 1 viewed from a muffler side, FIG. 3 is a partially cutaway perspective view of the exhaust gas turbocharger shown in FIG. 1 viewed from a turbine side, FIG. 4 is a diagram of a generator shown in FIG. 1 viewed from the muffler side and is a front view of a cover member that forms the generator, FIG. 5 is a sectional view taken along arrows V-V in FIG. 4, FIG. 6 is a sectional view taken along arrows VI-VI in FIG. 4, FIG. 7A is a diagram in which a relevant portion in FIG. 5 is shown in enlargement, and FIG. 7B is a sectional view taken along arrows b-b in FIG. 7A.

As shown in FIGS. 1 to 3, the configuration of an exhaust gas turbocharger 1 according to this embodiment includes, as main components, a turbine unit 3 that is driven by exhaust gas (combustion gas) 2 guided from an unillustrated internal combustion engine (for example, a diesel engine, a gas turbine engine, or the like), a compressor unit 5 that is driven by the turbine unit 3 and that feeds fresh air 4 to the internal combustion engine described above, and a casing 6 that is provided between the turbine unit 3 and the compressor unit 5 to support them.

A rotation shaft 7 is inserted in the casing 6 so that one end thereof protrudes on the turbine-unit 3 side and the other end thereof protrudes on the compressor-unit 5 side. This rotation shaft 7 is supported by a bearing 8 provided in the casing 6 so as to be rotatable about the axis thereof. In addition, the casing 6 is provided with a lubrication-oil supply channel 9 that supplies lubrication oil from a lubrication-oil reservoir (not shown) to the bearing 8.

The bottom end of the casing 6 serves as a leg 6a that supports the casing 6 at one point in the axial direction of the rotation shaft 7 (in some cases, supports at two points or more in a direction perpendicular to the axial direction of the rotation shaft 7), and this leg 6a is secured to a base (not shown) installed on a floor surface. Specifically, the weight of the exhaust gas turbocharger 1 is transmitted to the base via this leg 6a.

Reference sign P in the drawings indicates a punching plate. This punching plate P is secured to the bottom end of the turbine unit 3 at one end and is secured to the base at the other end, as with the leg 6a of the casing 6. Also, unlike the leg 6a, supporting the weight of the exhaust gas turbocharger 1 is not the main purpose of this punching plate P; the main purpose thereof is to prevent the exhaust gas turbocharger 1 from shaking (vibrating) with respect to the base.

The turbine unit 3 includes an exhaust-gas pathway 10 that is connected to an exhaust system of the internal combustion engine described above, via which at least a portion of the exhaust gas 2 is supplied, and a turbine 11 that is rotationally driven by receiving a flow of the exhaust gas 2 supplied into this exhaust-gas pathway 10.

The turbine 11 is provided with a turbine rotor 12 and turbine nozzles 13. The turbine rotor 12 is provided with a disk-shaped turbine disk 12a provided at one end of the rotation shaft 7 and a plurality of turbine blades 12b that are attached on the outer circumference of this turbine disk 12a and that have airfoil cross sections.

The turbine nozzles 13 are formed of a plurality of nozzle guide vanes 13a that are disposed in the form of a ring and are disposed on the upstream side of the turbine blades 12b.

The exhaust-gas pathway 10 includes a supply channel 10a that is connected to the exhaust system of the internal combustion engine described above and that guides the exhaust gas 2 to the nozzle guide vanes 13a and the turbine blades 12b and an outflow channel 10b that is provided on a radially outer side of the turbine 11 and that guides the exhaust gas 2 that has passed through the turbine 11 to outside the system or to an unillustrated exhaust purifying device or the like.

The compressor unit 5 includes a compressor impeller 14 that, by being rotationally driven, causes the fresh air 4 to flow out radially outward and a spiral chamber 15 that surrounds the periphery of this compressor impeller 14 and that compresses the fresh air 4 that the compressor impeller 14 has caused to flow out therefrom.

The compressor impeller 14 is provided with a substantially disk-shaped hub 14a that is attached to the other end of the rotation shaft 7 and a plurality of blades 14b that extend radially outward from an outer surface of the hub 14a and that are also provided along the circumferential direction thereof in the form of a ring.

A muffler (silencer) 16 that is connected to an air-intake system of the internal combustion engine described above is disposed on the upstream side of the compressor unit 5 so as to be adjacent thereto, and the fresh air 4 that has passed through this muffler 16 is guided to the blades 14b of the compressor impeller 14 via an inflow channel 17. An intercooler, a surge tank, and so forth, which are not illustrated, are provided on the downstream side of the compressor unit 5, and the fresh air 4 that has passed through the centrifugal chamber 15 is supplied to the internal combustion engine described above after passing through the intercooler, the surge tank, and so forth.

A shell housing 18 that has a depression 18a, which is formed so as to become narrower toward an end surface of the hub 14a, is provided inside the muffler 16 at a center portion thereof, and a (high-speed induction) generator 19 is accommodated in the depression 18a. The shell housing 18 is secured to the compressor unit 5 (a wall surface on a radially outer side that forms the inflow channel 17) by means of a plurality of (for example, four) supports 20 provided in the inflow channel 17. Then, an outer surface of the shell housing 18 forms a wall surface on a radially inner side which forms the inflow channel 17.

The generator 19 is disposed so that a rotation shaft 19a thereof is positioned on the same rotation axis as the rotation shaft 7 described above, and this rotation shaft 19a is also linked, via a flexible coupling 21, to the tip at one end of the rotation shaft 7 protruding on the muffler 16 side by penetrating through the hub 14a. Specifically, the rotation shaft 19a of the generator 19 is configured so as to be rotated together with the rotation shaft 7.

As shown in FIGS. 5 and 6, the generator 19 includes, as main components, a stator 31 and a rotor 32. The stator 31 is provided with an iron core 33 and a coil 34; the rotor 32 is joined with the rotation shaft 19a to form a single part; and the stator 31 and the rotor 32 are accommodated in a hollow-cylindrical generator housing 35. A (first) opening formed at one end (right side in FIGS. 5 and 6) of the generator housing 35 is closed off by a (first) cover member 36, and a (second) opening formed at the other end (left side in FIGS. 5 and 6) of the generator housing 35 is closed off by a (second) cover member 37. A through-hole 38 where a first end (right-side end in FIGS. 5 and 6) of the rotation shaft 19a passes through is formed at a center portion of the cover member 36, and the first end of the rotation shaft 19a is supported by the cover member 36 by means of a slide bearing 39. On the other hand, a depression 40 that receives (accommodates) a second end (left-side end in FIGS. 5 and 6) of the rotation shaft 19a is formed at a center portion of the cover member 37, and the second end of the rotation shaft 19a is bearing supported by the cover member 37 by means of a slide bearing 41. The generator housing 35 has a split-in-two structure that can be divided into two parts at a plane including the rotation axis of the rotation shaft 19a, and the two parts are joined by means of a plurality of bolts (not shown).

A hollow-cylindrical liner 42 that is formed so as to come in contact with both an outer circumferential surface 33a of the iron core 33 and an inner circumferential surface 35a of the generator housing 35 is provided between the iron core 33 and the generator housing 35, and a pathway (water jacket) 43 for allowing a cooling medium (water or a cooling liquid or the like similar thereto) to flow is formed inside the liner 42.

As shown in FIG. 5, (first) holes 44 having a circular shape in cross-sectional view are formed along the axial direction (left-to-right direction in FIG. 5) in the generator housing 35 and the cover member 37 so as to reach predetermined positions, and, in the generator housing 35, (first) holes 45 that communicate between the holes 44 and inlets (see FIGS. 7A and 7B) 43a of the pathways 43 are formed along the radial direction (top-to-bottom direction in FIG. 5). Cooling-medium supply pipes 46 for supplying the cooling medium into the holes 44 are connected to inlets of the holes 44.

On the other hand, as shown in FIG. 6, (second) holes 47 having a circular shape in cross-sectional view are formed along the axial direction (left-to-right direction in FIG. 6) in the generator housing 35 and the cover member 37 so as to reach predetermined positions, and, in the generator housing 35, (second) holes 48 that communicate between the holes 47 and outlets (see FIGS. 7A and 7B) 43b of the pathways 43 are formed along the radial direction (top-to-bottom direction in FIG. 6). Cooling-medium exhaust pipes 30 for exhausting the cooling medium from the holes 47 are connected to outlets of the holes 47.

As shown in FIGS. 7A and 7B, ring-like members 49 are individually provided in joints (connecting portions) between the pathways 43 and the holes 45. The ring-like members 49 are plate-like members having a predetermined plate thickness and a circular shape in plan view, and through-holes 50 that penetrate therethrough in the plate-thickness direction (top-to-bottom direction in FIGS. 7A and 7B) are formed at center portions thereof. Two circumferential grooves 51 are formed along the circumferential direction in each of front surfaces (surfaces facing the liner 42) 49a and back surfaces (surfaces facing the generator housing 35) 49b of the ring-like members 49, and O-rings 52 are accommodated in the individual circumferential grooves 51. In outer circumferential surfaces 42a of the liner 42 in the peripheries (vicinities) of the inlets 43a of the pathways 43, (first) depressions 53, which have a circular shape in plan view and which accommodate the front surfaces 49a and outer circumferential surfaces 49c of the ring-like members 49 positioned on the liner 42 side, are individually formed, and (second) depressions 54, which have a circular shape in plan view and which accommodate the back surfaces 49b and outer circumferential surfaces 49d of the ring-like members 49 positioned on the generator-housing 35 side, are formed in inner circumferential surfaces 35a of the generator housing 35 in the peripheries (vicinities) of the outlets 45a of the holes 45. Then, by aligning the positions of the depressions 53 and the depressions 54 (bringing the depressions 53 formed in the liner 42 to positions that face the depressions 54 formed in the generator housing 35), spaces that accommodate the ring-like members 49 are formed by the depressions 53 and the depressions 54. Inner diameters of these spaces are set so as to be the same as outer diameters of the ring-like members 49 or slightly larger than the outer diameters of the ring-like members 49, and heights thereof are set so as to be the same as heights of the ring-like members 49 or slightly higher than the heights of the ring-like members 49. Then, in a state in which the ring-like members 49 are accommodated in these spaces, the O-rings 52 accommodated in the circumferential grooves 51 are placed in a pressed state (deformed state) by means of the front surfaces 49a or the back surfaces 49b of the ring-like members 49, and, by doing so, it is possible to prevent leakage (outflow) of the cooling medium from between joining surfaces of the generator housing 35 and the liner 42, that is, between the inner circumferential surface 35a of the generator housing 35 and the outer circumferential surface 42a of the liner 42.

The ring-like members 49 and the depressions 53 and 54 are also individually provided at joints (connecting portions) between the pathways 43 and the holes 48.

In the exhaust gas turbocharger 1 according to this embodiment, the generator housing 35 that accommodates the liner 42 and the stator 31 has the split-in-two structure that can be divided into two parts at the plane including the rotation axis of the rotation shaft 19a, and, during a maintenance inspection, merely by removing one part of the generator housing 35 from the other part thereof, it is possible to expose the liner 42 and the stator 31 that are accommodated in the interior thereof.

The liner 42 and the generator housing 35 are connected (linked) solely by the ring-like members 49 that are disposed in the individual joints between the pathways 43 and the holes 44 and 45 for supplying the cooling medium to the pathways 43 and also the holes 47 and 48 for exhausting the cooling medium from the pathways 43.

By doing so, it is possible to replace only the liner 42 and the stator 31 by easily removing the liner 42 and the stator 31 from the generator housing 35 during a maintenance inspection, and thus, it is possible to reduce the maintenance inspection costs.

It is easy to remove the liner 42 and the stator 31 from the generator housing 35 and to attach the liner 42 and the stator 31 to the generator housing 35, and thus, the amount of time required for disassembly and assembly can be reduced, which makes it possible to enhance the ease of maintenance.

In the state in which the ring-like members 49 are disposed in the individual joints between the holes 44 and 45 and the pathways 43, as well as in the individual joints between the holes 47 and 48 and the pathways 43, the O-rings 52 accommodated in the circumferential grooves 51 are placed in a pressed state (deformed state) by means of the outer circumferential surfaces 42a of the liner 42 (bottom surfaces of the depressions 53 to be more specific) and the front surfaces 49a of the ring-like members 49 (bottom surfaces of the circumferential grooves 51 to be more specific) or by means of the inner circumferential surfaces 35a of the generator housing 35 (bottom surfaces of the depressions 54 to be more specific) and the back surfaces 49b of the ring-like members 49 (bottom surfaces of the circumferential grooves 51 to be more specific).

By doing so, it is possible to reliably prevent leakage (outflow) of the cooling medium from between the joining surfaces between the generator housing 35 and the liner 42, that is, between the inner circumferential surface 35a of the generator housing 35 and the outer circumferential surface 42a of the liner 42.

The depressions 53, which have a circular shape in plan view and which accommodate the front surfaces 49a and the outer circumferential surfaces 49c of the ring-like members 49 positioned on the liner 42 side, are individually formed in the outer circumferential surfaces 42a of the liner 42 in the peripheries of the inlets 43a of the pathways 43, and the depressions 54, which have a circular shape in plan view and which accommodate the back surfaces 49b and the outer circumferential surfaces 49d of the ring-like members 49 positioned on the generator-housing 35 side, are formed in the inner circumferential surfaces 35a of the generator housing 35 in the peripheries of the outlets 45a of the holes 45.

By doing so, it is possible to prevent the liner 42 and the stator 31 attached (secured) to this liner 42 from rotating in the circumferential direction.

Because the internal combustion engine (not shown) according to the present invention is equipped with the exhaust gas turbocharger 1 having excellent ease of maintenance, making it possible to reduce the maintenance inspection costs, running costs can be reduced and stoppage time required for a maintenance inspection can be reduced.

The present invention is not limited to the embodiment described above, and various alterations and modifications are permissible within a range that does not depart from the spirit of the present invention.

For example, in the embodiment described above, the ring-like members 49, having a ring shape in plan view are disposed in the individual joints between the pathways 43 and the holes 45, as well as in the individual joints between the pathways 43 and the holes 48. However, the plant-view shape of the members to be disposed between the individual joints between the pathways 43 and the holes 45, as well as in the individual joints between the pathways 43 and the holes 48, may be a shape other than the ring shape (any shape, such as an elliptical shape, a rectangular shape, a square shape, a triangular shape, or the like).

REFERENCE SIGNS LIST

1 exhaust gas turbocharger
2 exhaust gas
3 turbine unit
4 fresh air
5 compressor unit
7 rotation shaft
19 generator
19a rotation shaft
31 stator
35 generator housing
42 liner
43 pathway
44 hole (first hole)
45 hole (first hole)
47 hole (second hole)
48 hole (second hole)
49 ring-like member
49a front surface
49b back surface
50 through-hole
51 circumferential groove
52 O-ring

The invention claimed is:

1. An exhaust gas turbocharger comprising:
a turbine unit that is driven by exhaust gas guided thereto from an internal combustion engine;
a compressor unit that is driven by the turbine unit to feed fresh air to an internal combustion engine; and
a generator having a rotation shaft of the generator that is linked to rotation shafts of the turbine unit and the compressor unit,
wherein a generator housing that accommodates, in the interior thereof, a hollow-cylindrical liner that forms the generator, in which a pathway for allowing a cooling medium that cools the generator to flow is formed in the interior thereof, and a stator that forms the generator, which is disposed on a radially inner side of the liner, can be divided into two parts at a plane including the rotation axis of the rotation shaft of the generator; and
individual joints formed inside the generator housing between the pathway and a first hole for supplying the cooling medium to the pathway and also a second hole for exhausting the cooling medium from the pathway are provided with ring-like members that are provided with front surfaces that face the liner and back surfaces that face the generator housing and that have a through-hole that communicates between the first hole and the pathway or a through-hole that communicates between the second hole and the pathway at center portions thereof.

2. An exhaust gas turbocharger according to claim 1, wherein at least one circumferential groove is formed along a circumferential direction in each of the front surfaces and the back surface, and O-rings are disposed in the individual circumferential grooves.

3. An internal combustion engine equipped with the exhaust gas turbocharger according to claim 1.

4. A generator wherein
- a generator housing that accommodates, in an interior thereof, a hollow-cylindrical liner, in which a pathway for allowing a cooling medium to flow is formed in the interior thereof and a stator, which is disposed on a radially inner side of the liner, can be divided into two parts at a plane including a rotation axis of a rotation shaft; and
- individual joints formed inside the generator housing between the pathway and a first hole for supplying the cooling medium to the pathway and also a second hole for exhausting the cooling medium from the pathway are provided with ring-like members that are provided with front surfaces that face the liner and back surfaces that face the generator housing and that have a through-hole that communicates between the first hole and the pathway or a through-hole that communicates between the second hole and the pathway at center portions thereof.

5. A generator according to claim 4, wherein at least one circumferential groove is formed along circumferential direction in each of the front surfaces and the back surface, and O-rings are disposed in the individual circumferential grooves.

* * * * *